Patented Sept. 23, 1947

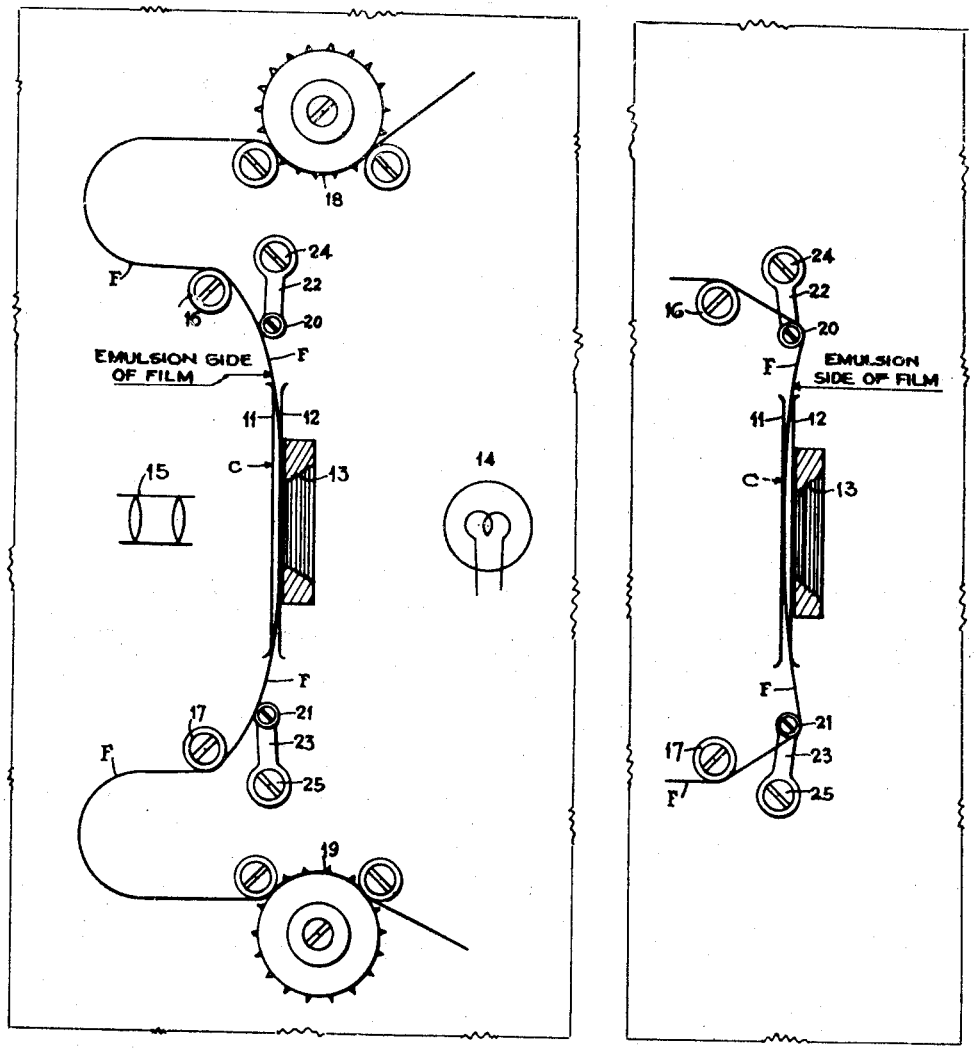

2,427,773

UNITED STATES PATENT OFFICE 2,427,773

METHOD AND MEANS FOR PREVENTING FILM SCRATCHING IN MOTION-PICTURE APPARATUS

James Monroe Fort, Los Angeles, Calif., assignor to Twentieth Century-Fox Film Corporation, Los Angeles, Calif., a corporation of New York Application October 13, 1944, Serial No. 558,584

8 Claims. (Cl. 88—17)

1

This invention relates to motion picture apparatus and deals particularly with a method and a means for preventing film scratches while the film is being run through such apparatus.

The invention to be described hereinafter was conceived in connection with a motion picture projecting apparatus, but it will become evident to those skilled in the motion picture art that the same method may be used in motion picture cameras as well as in projectors. To those versed in this art, it is a known fact that scratches appear upon film as a result of running the film through motion picture machines. In the projection field where the same film is run repeatedly through projection machines, scratching becomes a serious problem since it sooner or later reduces the film to such a condition that it can no longer be used. Therefore, the invention will be described in terms fitting both the protographing field and the projecting field of the motion picture art.

The principal object of this invention is to provide a method of running film through motion picture apparatus, whereby the film is forced to assume a transverse bend within the film chute of such apparatus.

More specifically, it is an object of this invention to provide a method of the above character wherein the transverse bend in the film is in the direction which brings the Celluloid side of the film into contact with the chute wall and holds the emulsion side of the film free and clear of engagement with the wall of the chute.

A further specific object of the invention is to provide a film engaging roller adapted to force the film to enter the chute at an angle. This feature may be used at either or both of the points where the film enters or leaves the chute.

The invention will be more fully understood when read in conjunction with the drawings in which:

Figure 1 is a diagrammatic view showing how my invention would be applied to any motion picture apparatus involving standard construction; and Figure 2 is a view similar to Figure 1, showing a reverse arrangement of my invention to achieve a result contrary to that of Figure 1.

Broadly speaking, the method involved in my invention consists in so manipulating the film as it enters the film chute that a transverse bend is forced to take place in the film within the chute. By forcing a transverse bend in the film at a desired point and by maintaining such a bend in the film under running conditions, it is obvious that the film may be passed through the chute by a three point contact; that is, it contacts the chute at the points where it enters and leaves the chute and an intermediate point on the opposite wall within the chute. Under this arrangement, whereby the film is forced to bend and to contact the opposite wall of the chute on the Celluloid side of the film, the emulsion side runs through the chute free and clear of any engagement with the chute walls. The result is that the emulsion side of the film, which is the tender side of the film, does not come in contact with the chute as it passes the aperture, and there is little or no scratching on the film. In actual practice it has been found that by using my invention, particularly in projectors, the life of the film may be increased many times over its usual run.

In practicing my method, the procedure is simple. As the film enters the chute, I force it to enter at a slight angle. The same procedure may be followed where the film leaves the chute. The result is that the film in the chute is forced away from the points where it enters and leaves the chute and assumes a slight transverse bend within the chute. The bend naturally bears against the opposite wall of the chute. Therefore, if the emulsion side of the film is run on the concave side of the bend, it will be kept free of contact with either wall of the chute and since the bulk of the scratching has been found to occur on the emulsion side of the film within the chute, it becomes obvious that film scratching will be reduced under this method. The means for doing this can best be explained by referring to Figure 1.

In Figure 1 it will be seen that I have shown diagrammatically only those elements of a projection machine that enter into my invention. The other parts of the machine are not shown since they are standard construction and do not become a part of the invention. The parts shown diagrammatically comprise a film chute C having walls 11 and 12 associated with a picture aperture 13. A light 14 furnishes the illumination and a lens 15 focuses the image of the picture on a screen not shown. The intermittent movement for moving the film past the aperture 13 is not shown since it is not part of the invention and since my invention will work with any type of conventional intermittent movement. Above and below the chute are the ordinary guide rollers 16 and 17. A feed sprocket 18 supplies the film to the chute and a take-off sprocket 19 takes the film away from the aperture, all in the ordinary manner.

As will be observed, the walls 11 and 12 of the film chute are spaced apart so that the film may travel freely through the chute. My invention provides a roller 20 at the top of the chute, and a similar roller 21 at the bottom of the chute may be used if found necessary or desirable. As shown in Figure 1, these rollers are arranged to engage the film F and force it to bear against the plate 11 at both ends of the chute C. Under normal running conditions, the film should not leave the rollers 16, 17, 20, and 21 at any time. The angle of entrance into the chute C is just sufficient to force the film to flow from wall 11 to wall 12 and the angle at which it leaves the chute being of the reverse order, the film flows from wall 12 back to wall 11 and out over the end of the wall, thus forming a transverse bend in the film approximately intermediate the ends of the chute. Since this transverse bend bears against the wall 12, it is obvious that the side of the film toward the wall 11 will not contact the chute except at the entry points at the end of the walls of the chute, which points are made to engage the film on the margins only. Now then, if the emulsion side of the film is run toward wall 11, it is clear that there is no contact of the film on the emulsion side with the chute at any point. Accordingly, there should be no scratching of the film as it passes through the chute. This result has been actually verified in practice and it can be stated that by forcing the film to run through a chute in the manner just described, scratching has been practically eliminated and film which heretofore could be run only a few times before it was discarded can now be run a great many times by using my invention.

Since there may be occasions when it would be necessary to run film through a movement with the emulsion on the reverse side of the film, my invention provides means for forcing the film to enter the chute at the proper angle regardless of which side the emulsion faces.

For this purpose I have shown in Figure 2 a set-up similar to Figure 1, wherein the emulsion side of the film has been reversed. Here it will be noted that the film F contacts the end of the wall 12 as it enters the chute C and leaves the chute by contacting the lower end of the same wall. This has been brought about by adjusting the roller 20 so that the angle of entry of the film has been changed from wall 11 to wall 12 and the roller 21 has likewise been changed. To accomplish these changes, I mount the rollers 20 and 21 upon arms 22 and 23 respectively and pivot these arms to any convenient part of the structure that supports the film moving mechanism by means of screws 24 and 25 respectively. With the above adjustable feature, I may run film through a motion picture apparatus with the emulsion facing either way and still practice my invention.

I claim:

1. A method for preventing film scratching in motion picture apparatus having a film chute with substantially straight walls spaced a sufficient distance apart to permit film to pass freely through said chute and assume a curved position therein, consisting in forcing the film to pass through a transverse bend in the film chute with the emulsion side of the film on the concave side of the bend.

2. A method for preventing film scratching in motion picture apparatus having a film chute with substantially straight walls spaced a sufficient distance apart to permit film to pass freely through said chute and assume a curved position therein, consisting in forcing the film to follow an arcuate path through the film chute with the emulsion side of the film on the concave side of the path.

3. A method for preventing film scratching in motion picture apparatus having a film chute with substantially straight walls spaced a sufficient distance apart to permit film to pass freely through said chute and assume a curved position therein, consisting in feeding the film into the film chute at an angle that forces the film to flow from one chute wall to the other, thereby forming a transverse bend in the film in the chute with the emulsion side of the film on the concave side of the bend.

4. A method for preventing film scratching in motion picture apparatus having a film chute with substantially straight walls spaced a sufficient distance apart to permit film to pass freely through said chute and assume a curved position therein, consisting in running the film into and out of the film chute at such an angle that the film is forced into a transverse bend in the chute with the emulsion side of the film on the concave side of the bend.

5. In motion picture apparatus having a film chute with substantially straight walls spaced a sufficient distance apart to permit film to pass freely through said chute and assume a curved position therein, a film engaging roller near the entrance of said chute adapted to force the film to enter the chute at an angle and to flow from one chute wall to the other.

6. In motion picture apparatus having a film chute with substantially straight walls spaced a sufficient distance apart to permit film to pass freely through said chute and assume a curved position therein, a film engaging roller near the entrance of said chute and a second film roller near the exit of said chute, said rollers being adapted to force the film to enter and leave the chute at an angle, thereby forming a transverse bend in the film in the chute.

7. In motion picture apparatus having a film chute with substantially straight walls spaced a sufficient distance apart to permit film to pass freely through said chute and assume a curved position therein, a film engaging roller near the entrance of said chute adapted to force the film to enter the chute at an angle and to flow from one chute wall to the other, and means for adjusting said roller to vary the angle at which the film enters said chute.

8. In motion picture apparatus having a film chute with substantially straight walls spaced a sufficient distance apart to permit film to pass freely through said chute and assume a curved position therein, a film engaging roller near the entrance of said chute and a second film roller near the exit of said chute, said rollers being adapted to force the film to enter and leave the chute at an angle, thereby forming a transverse bend in the film in the chute, and means for adjusting said rollers independently to vary the angles at which the film enters and leaves said chute.

JAMES MONROE FORT.

REFERENCES CITED

The following references are of record in the file of this patent:

UNITED STATES PATENTS

| Number | Name | Date |
|---|---|---|
| 1,933,783 | Wittel | Nov. 7, 1933 |
| 2,057,553 | Boecking | Oct. 13, 1936 |
| 2,229,924 | Howell | Jan. 28, 1941 |
| 2,350,780 | Lechleitner | June 6, 1944 |
| 899,543 | Knaak | Sept. 29, 1908 |
| 1,183,220 | Mehlfelder | May 16, 1916 |
| 1,198,682 | Victor | Sept. 19, 1916 |
| 1,941,676 | Frappier et al. | Jan. 2, 1934 |
| 1,945,909 | Moreno | Feb. 6, 1934 |
| 1,980,600 | Spoor | Nov. 13, 1934 |

FOREIGN PATENTS

| Number | Country | Date |
|---|---|---|
| 510,529 | Great Britain | Aug. 2, 1939 |